Patented July 8, 1947

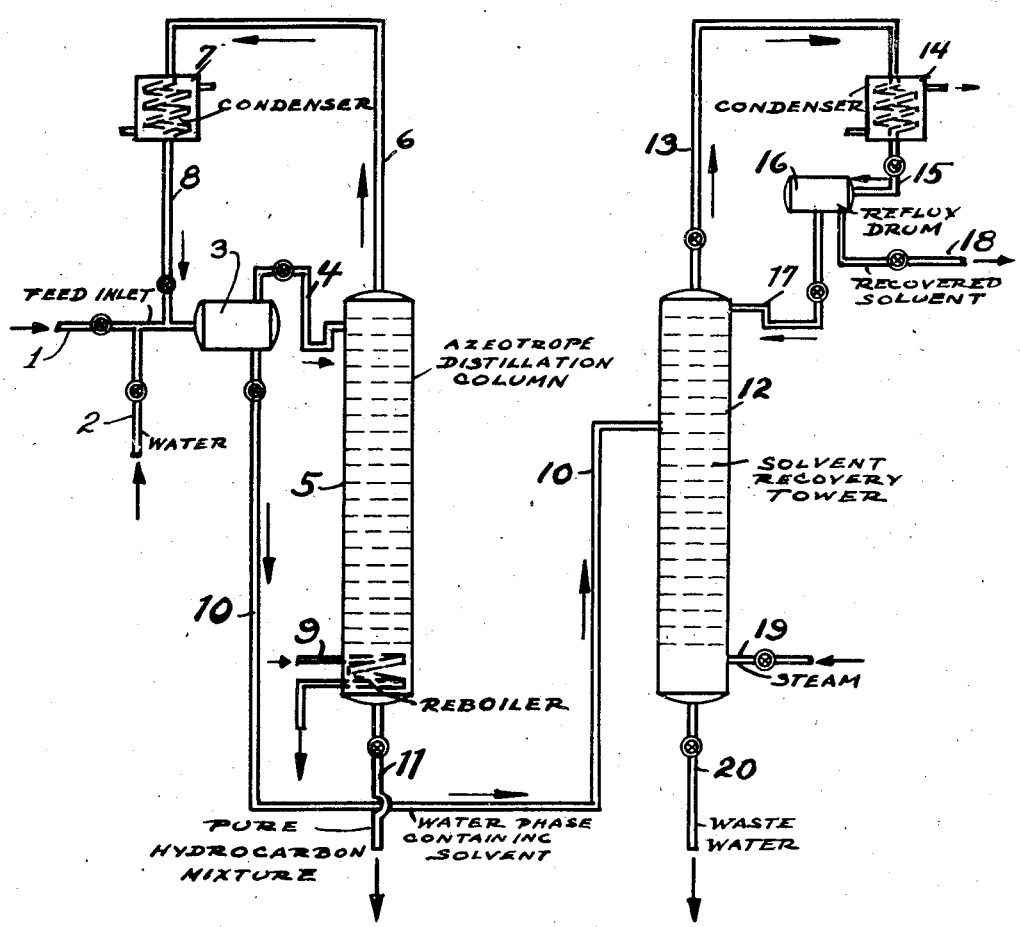

2,423,795

UNITED STATES PATENT OFFICE 2,423,795

RECOVERY OF HYDROCARBONS AND ACETONE FROM ADMIXTURES BY PHASE SEPARATION AND AZEOTROPIC DISTILLATION

John A. Patterson, Westfield, N. J., assignor to Standard Oil Development Company, a corporation of Delaware Application January 1, 1943, Serial No. 470,978

4 Claims. (Cl. 202—42)

This invention relates to the treatment of hydrocarbon solutions containing acetone, in order to effect separation of the constituents in a commercially advantageous manner. The invention relates particularly to the separation of the hydrocarbon and acetone from the products of extractive distillation systems.

Many processes are at present being employed for the separation of valuable hydrocarbons from complex mixtures, such as refinery by-products, for the preparation of chemical specialties and synthetic products. One particularly advantageous manner of processing complex hydrocarbon mixtures to separate the relatively volatile low molecular-weight unsaturated hydrocarbons is the combination of fractional distillation and extractive distillation. In extractive distillation the solvents employed are frequently water soluble and quite commonly admixed with water, and form azeotropic mixtures with the hydrocarbon products. The commercial advantage of such processing increases as the degree of recovery of the solvent employed in the extractive distillation is made more efficient. When the solvent employed in an extractive distillation is water soluble, the method of removing the solvent from the products of the extractive distillation system may clearly be effected by water treatment. Such treatment however has in general the disadvantages of requiring relatively large volumes of water and thus the production of very dilute solutions which are costly to distill for the recovery of the primary solvent.

It is an object of the present invention to provide a cheaper and more efficient means of recovering acetone from the products of an extractive distillation system in which acetone is employed. It is also an object of the invention to furnish processing for the separation of individual hydrocarbons from complex mixtures upon a particularly advantageous economic basis by utilizing the formation of azeotropic compositions which commonly occur in many extractive distillation systems employing acetone as a means of recovering the solvents themselves. Other objects will be apparent from the reading of the following description of the invention.

If water be added to the distillate products of an extractive distillation system in which a complex hydrocarbon mixture is being treated and in which acetone is being employed, a diphase ternary liquid mixture can be formed. In the phase separation of such a mixture, the upper phase consists predominantly of hydrocarbons, a minor quantity of acetone and a lesser amount of water; while the lower phase consists of a solution of the acetone in water together with a minor quantity of hydrocarbon material. From such a diphase mixture the hydrocarbon material can be recovered in a highly purified state by passing the upper essentially hydrocarbon layer to a distillation system and adding such quantities of water as are required to form an azeotropic ternary composition of hydrocarbon, acetone and water with all of the acetone present in the hydrocarbon phase. Thus, all the acetone is distilled from the hydrocarbon as its ternary azeotropic mixture with the hydrocarbon and water, having as the distillation residue the hydrocarbon free of solvent and water. The azeotropic mixture will clearly contain a considerably higher concentration of the solvent and lower concentration of the hydrocarbon than the hydrocarbon phase initially fed to the distillation tower. The azeotropic distillate may be treated in a manner similar to that to which the product from the extractive distillation was subjected. In this manner all of the hydrocarbon may be recovered in a highly purified state while all of the solvent is recovered as its solution in water. Clearly also, an added advantage in such processing is the addition to the upper essentially hydrocarbon layer in the distillation operation of controlled amounts of the substantially aqueous phase rather than of water. The present invention is the commercial utilization of such treatments as the means for separating the hydrocarbon and solvent materials from the distillate products of extractive distillation systems employing water-soluble acetone.

Thus, the invention relates particularly to the distillate products of extractive distillation systems treating complex hydrocarbon mixtures employing acetone. The method is to add an amount of water to the mixture of acetone and hydrocarbon sufficient to cause a separation of a diphase ternary mixture. After phase separation the upper or essentially hydrocarbon phase is removed and distilled in the presence of just enough water or of the lower or aqueous phase to effect the separation as a distillate material a ternary azeotropic composition of hydrocarbon, acetone and water. The amount of water added to the distillation system is adjusted to hold the quantity of aqueous phase thus refluxed in the preferable means of operation to a practical minimum. On condensation, the ternary azeotrope may be made to separate into two layers suitable for continued processions by the addition of controlled amounts of water. Each of these phases may be combined with the corresponding phase of the original mixture of hydrocarbon, solvent and water. Alternatively, the condensate mixture may be mixed with the feed to the recovery system, so that only one phase separating equipment is required. The bottoms from the distillation column will consist essentially of pure hydrocarbon. The amount of aqueous or lower layer not supplied to the azeotropic distillation column is subjected to a simple distillation, and thus there is obtained as products from this operation relatively pure solvent and essentially solvent-free water. The solvent-water mixture however supplied as feed to this distillation treatment is much richer than that obtained by solvent extraction processing with water of the spent hydrocarbon fraction from the extractive distillation system. Thus, a considerable saving in operating costs is effected.

In order to illustrate more specifically the invention, the following example of one method of operating according to the invention is presented. In the description, reference is made to solvent recovery after extractive distillation with acetone as the solvent of a mixture of $C_5$ hydrocarbons. The numerals given in the description refer to the accompanying drawing.

A mixture of $C_5$ hydrocarbons and acetone condensed from the overhead vapors leaving a vapor-liquid extraction zone, which may contain from 4 to 12% acetone, is shown as stream 1 entering a decanter, 3. Also entering the decanter through line 8 is a two-phase condensed mixture of acetone, water, and hydrocarbon and a stream of water through line 2 limited in amount in accordance with the previous analysis of the invention. In the present instance, it will be about 10% base on the feed for 10% acetone in the feed. The mixture in the decanter separates into two layers, the upper layer being fed through line 4 to the top of the azeotropic distillation column 5, and the lower layer being fed through line 10 to a suitable intermediate point of the solvent recovery column 12. Steam is supplied to a heating coil, 9 in the first column, and is blown directly into the bottom of the second column through line 19. The overhead fraction leaving the first distillation column through line 6 is condensed in condenser 7 and mixed with the feed to the decanter as mentioned previously, while the bottoms from the column leaving through line 11 consist essentially of solvent-free $C_5$ hydrocarbon, which may be utilized in any desired manner. The overhead fraction leaving the second, or solvent recovery column through line 13 is condensed in equipment 14 and allowed to run through line 15 into the drum 16. From the drum 16 part of the condensate is returned to the top of the column as reflux through line 17 while the remainder is withdrawn through line 18 as recovered solvent. This latter quantity of recovered solvent may be recycled to the vapor-liquid extraction zone. The bottoms leaving the second column through line 20 consist of essentially solvent-free water, and may be discarded or partially returned to the decanter through line 2.

Thus, processing according to the invention involves not only a saving in processing costs due to the handling of a more concentrated acetone stream, but also the advantage of there being a much less increase in investment cost than is necessitated by the use of an additional distillation column, when solvent extraction methods for recovery of the solvent material are employed. The saving is made by reason of the fact that the diameter and number of plates in the solvent recovery column are substantially reduced.

What is claimed is:

1. The method of recovering aliphatic hydrocarbons and acetone from a distillate product of an extractive distillation system employing acetone as the solvent in the treatment of a complex hydrocarbon mixture, which comprises adding water to the said distillate product to effect a diphase separation of an essentially hydrocarbon phase and an essentially aqueous acetone phase, distilling the essentially hydrocarbon phase with water in an amount to form a ternary azeotropic composition with the hydrocarbons and all of the acetone present, and recovering the hydrocarbons and the acetone from the products thus formed.

2. The method according to claim 1 in which the amount of water to form with the essentially hydrocarbon phase upon distillation of the said ternary azeotropic composition is supplied by the addition of a suitable quantity of the essentially aqueous acetone phase formed from the said distillate product of the said extractive distillation system.

3. The method according to claim 1 in which the ternary azeotropic composition is combined with the distillate product from the extractive distillation.

4. The method according to claim 1 in which the ternary azeotropic composition is diphase and in which the recovery of the hydrocarbon and solvent materials is aided by combining separately the two essentially hydrocarbon phases respectively and the two essentially aqueous solvent phases respectively.

JOHN A. PATTERSON.

REFERENCES CITED

The following references are of record in the file of this patent:

UNITED STATES PATENTS

| Number | Name | Date |
| --- | --- | --- |
| 2,246,376 | Lynch | June 17, 1941 |
| 2,212,810 | Field | Aug. 27, 1940 |
| 2,307,242 | Savelli | Jan. 5, 1943 |
| 2,177,183 | Kraft | Oct. 24, 1943 |
| 2,167,730 | Smoley | Aug. 1, 1939 |
| 2,261,780 | Whitely | Nov. 4, 1941 |
| 2,376,870 | Engel | May 26, 1944 |

FOREIGN PATENTS

| Number | Country | Date |
| --- | --- | --- |
| 101,321 | Austria | Oct. 26, 1925 |